(12) United States Patent
Shahriari et al.

(10) Patent No.: US 12,716,726 B2
(45) Date of Patent: Aug. 25, 2026

(54) RADAR-BASED MODEL FOR VEHICLE ODOMETRY ESTIMATION

(71) Applicant: GM Global Technology Operations LLC, Detroit, MI (US)

(72) Inventors: Mohammadali Shahriari, Markham (CA); Puneet Bagga, Etobicoke (CA); Praneeth Nelapati, Novi, MI (US); Hassan Askari, Thornhill (CA); Matan Yeger, Pardes Hanna-Karkur (IL)

(73) Assignee: GM GLOBAL TECHNOLOGY OPERATIONS LLC, Detroit, MI (US)

(*) Notice: Subject to any disclaimer, the term of this patent is extended or adjusted under 35 U.S.C. 154(b) by 37 days.

(21) Appl. No.: 18/828,242

(22) Filed: Sep. 9, 2024

(65) Prior Publication Data

US 2026/0071874 A1 Mar. 12, 2026

(51) Int. Cl.
*G01C 21/16* (2006.01)
*B60W 50/02* (2012.01)

(52) U.S. Cl.
CPC ..... *G01C 21/1652* (2020.08); *B60W 50/0205* (2013.01); *B60W 2050/021* (2013.01); *B60W 2050/0215* (2013.01); *B60W 2520/28* (2013.01); *B60W 2540/18* (2013.01)

(58) Field of Classification Search
CPC .......... G01C 21/1652; B60W 50/0205; B60W 2050/021; B60W 2050/0215; B60W 2520/28; B60W 2540/18
See application file for complete search history.

(56) References Cited

U.S. PATENT DOCUMENTS

2018/0136665 A1* 5/2018 Mudalige ............. G05D 1/0077
2020/0309530 A1* 10/2020 Slutsky .................. G06V 20/58
2023/0152796 A1* 5/2023 Zhang ................. G05D 1/0011 701/2

FOREIGN PATENT DOCUMENTS

CN 111102978 A 5/2020
DE 102008026397 A1 1/2009

* cited by examiner

*Primary Examiner* — Anne Marie Antonucci
*Assistant Examiner* — Luis G Del Valle
(74) *Attorney, Agent, or Firm* — Vivacqua Crane, PLLC

(57) ABSTRACT

A method for odometry estimation includes receiving a first sensor data and a second sensor data. The first sensor data is generated by an inertial measurement unit (IMU) of the vehicle, a wheel speed sensor (WSS), and a steering wheel angle sensor (SAS) of the vehicle. The second sensor data is generated by a radar of the vehicle. The method further includes determining an initial longitudinal position, an initial lateral position, and an initial heading of the vehicle using the first sensor data. The method further includes determining a longitudinal position error, a lateral position error, and a heading error of the vehicle using the second sensor data. Moreover, the method includes correcting the initial longitudinal position, the initial lateral position, and the initial heading of the vehicle using the longitudinal position error, the lateral position error, and the heading error.

20 Claims, 2 Drawing Sheets

RADAR-BASED MODEL FOR VEHICLE ODOMETRY ESTIMATION

INTRODUCTION

The present disclosure relates to methods and systems for estimating vehicle odometry using a radar-based model.

This introduction generally presents the context of the disclosure. Work of the presently named inventors, to the extent it is described in this introduction, as well as aspects of the description that may not otherwise qualify as prior art at the time of filing, are neither expressly nor impliedly admitted as prior art in this disclosure.

Vehicle odometry and state estimation play key role in advanced driver-assistance systems (ADAS) control in vehicles. Odometry estimation relies on different vehicle sensor data, which may change over the lifetime of the vehicle. Some vehicles use sensor data from an inertial measurement unit (IMU), a wheel speed sensor (WSS), and a steering wheel angle sensor (SAS) and a global navigation satellite system (GNSS) receiver. Radar information can provide orthogonal velocity and relative position movement of the vehicle. It is therefore desirable to develop a system and method that uses a utilizes radar data to adapt and enhance the parameter learns, correct the odometry adaptive filters, and enhance the accuracy of the odometry estimations.

SUMMARY

The present disclosure describes a method for determining vehicle odometry using radar data. Specifically, the method uses radar data to adapt and enhance the parameter learns, correct the odometry adaptive filters, and enhance the accuracy of the odometry estimations. In one aspect of the present disclosure, the method includes receiving, by a controller of a vehicle, a first sensor data. The first sensor data is generated by an inertial measurement unit (IMU) of the vehicle, a wheel speed sensor (WSS), and a steering wheel angle sensor (SAS) of the vehicle. The method further includes determining, by the controller of the vehicle, an initial longitudinal position, an initial lateral position, and an initial heading of the vehicle using the first sensor data. Further, the method includes receiving, by the controller of the vehicle, a second sensor data. The second sensor data is generated by a radar of the vehicle. The method further includes determining, by the controller of the vehicle, a longitudinal position error, a lateral position error, and a heading error of the vehicle using the second sensor data. Moreover, the method includes correcting the initial longitudinal position, the initial lateral position, and the initial heading of the vehicle using the longitudinal position error, the lateral position error, and the heading error, respectively, thereby generating a corrected longitudinal position, a corrected lateral position, and a corrected heading of the vehicle. Further, the method includes controlling the vehicle using the corrected longitudinal position, the corrected lateral position, and the corrected heading. The method described in this paragraph improves vehicle technology by allowing robust vehicle control with the use of improved (more accurate) vehicle position (i.e., longitudinal position and lateral position) and heading estimation. Using the improved vehicle position and the heading estimation, the vehicle may be precisely controlled with minimal errors.

In an aspect of the present disclosure, the initial longitudinal position, the initial lateral position, and the initial heading of the vehicle are determined using an adaptive filter, and the adaptive filter may be a Kalman filter. The corrected longitudinal position may be based on the longitudinal position gain. The corrected lateral position may be based on the lateral position gain. The corrected heading may be based on the heading gain. The method may further includes determining the lateral velocity, the longitudinal velocity, and the yaw rate of the vehicle using the first sensor data, the second sensor data, and the adaptive filter. The adaptive filter may be implemented using the following equations:

$$\Delta x_{k+1} = \Delta x_k + g_{k,x} e_{x,k}$$

$$\Delta y_{k+1} = \Delta y_k + g_{k,y} e_{y,k}$$

$$\Delta \psi_{k+1} = \Delta \psi_k + g_{k,\psi} e_{\psi,k}$$

where:

k is a time step;

$\Delta x_{k+1}$ is a filtered term for the longitudinal position of the vehicle;

$\Delta y_{k+1}$ is a filtered term for the lateral position of the vehicle;

$\Delta \psi_{k+1}$ is a filtered term for the heading of the vehicle;

$\Delta x_k$ is a change in a longitudinal position of the vehicle at time k;

$\Delta y_k$ is a change in a lateral position of the vehicle at time k;

$\Delta \psi_k$ is a change in a heading of the vehicle at time k;

$g_{k,x}$ is the longitudinal position gain at time k;

$g_{k,y}$ is the lateral position gain at time k;

$g_{k,\psi}$ is the heading gain at time k;

$e_{x,k}$ is the longitudinal position error at time k;

$e_{y,k}$ is the lateral position error at time k; and $e_{\psi,k}$ is the heading error at time k.

The present disclosure also describes a system for determining vehicle odometry. The system includes a plurality of sensors and a controller in communication with the sensors. The sensors include an inertial measurement unit (IMU), a wheel speed sensor (WSS), a steering wheel angle sensor (SAS), and a radar. The controller is programmed to execute the method described above.

The vehicle further includes a vehicle. The vehicle includes a vehicle body, plurality of sensors coupled to the vehicle body, and a controller in communication with the sensors. The sensors include an inertial measurement unit (IMU), a wheel speed sensor (WSS), a steering wheel angle sensor (SAS), and a radar. The controller is coupled to the vehicle body and is programmed to execute the method described above.

Further areas of applicability of the present disclosure will become apparent from the detailed description provided below. It should be understood that the detailed description and specific examples are intended for purposes of illustration only and are not intended to limit the scope of the disclosure.

The above features and advantages, and other features and advantages, of the presently disclosed system and method are readily apparent from the detailed description, including the claims, and exemplary embodiments when taken in connection with the accompanying drawings.

BRIEF DESCRIPTION OF THE DRAWINGS

The present disclosure will become more fully understood from the detailed description and the accompanying drawings, wherein.

DETAILED DESCRIPTION

Figure 1:
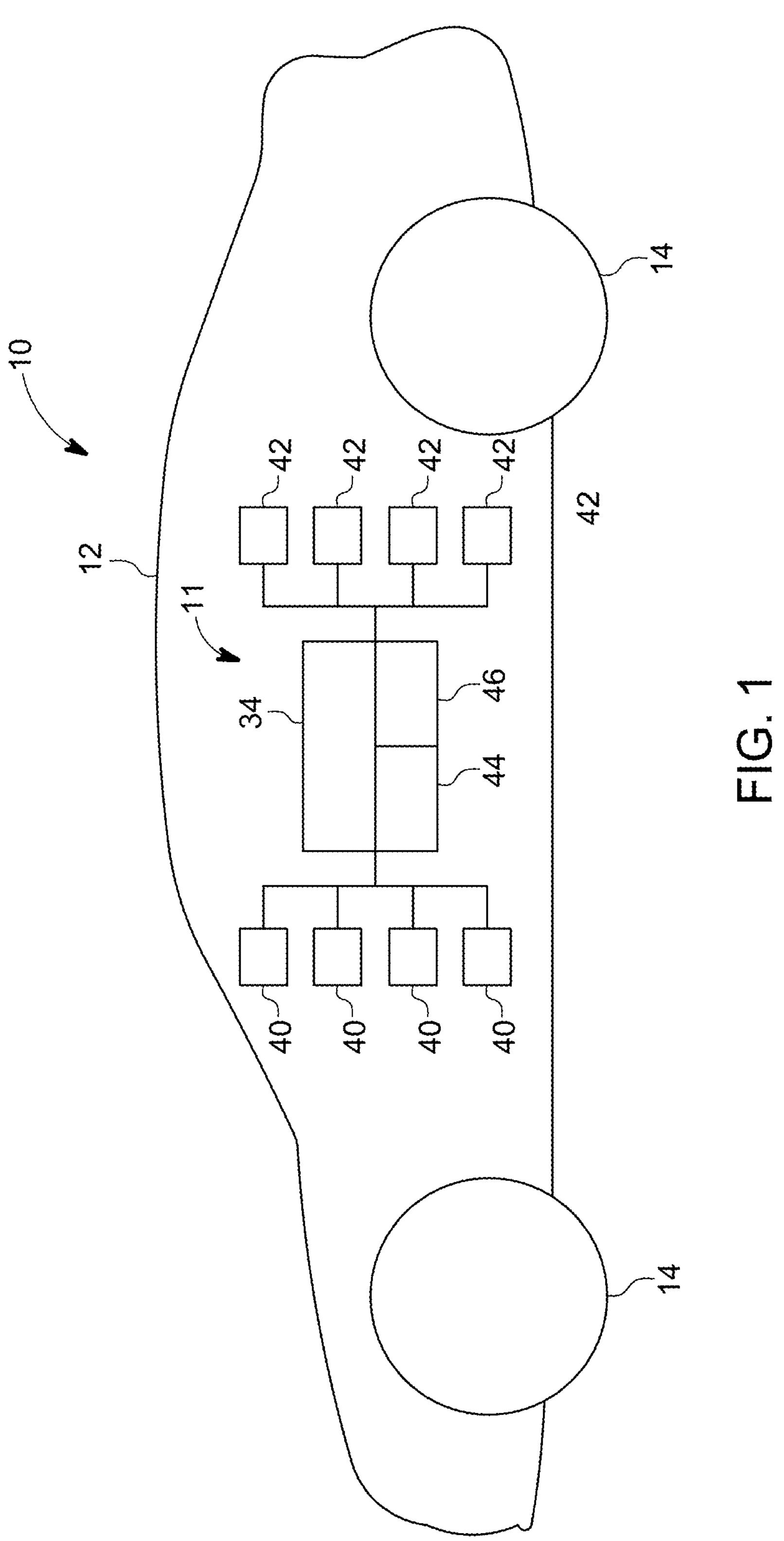
FIG. 1 is a schematic side view of a vehicle including a system for estimating vehicle odometry using a radar-based model.

Reference will now be made in detail to several examples of the disclosure that are illustrated in accompanying drawings. Whenever possible, the same or similar reference numerals are used in the drawings and the description to refer to the same or like parts or steps.

With reference to FIG. 1, a vehicle 10 includes (or is in communication with) a system 11 for odometry estimation. Although the vehicle 10 is shown as a coupe, it is envisioned that that vehicle 10 may be another type of vehicle, such as a pickup truck, a sedan, a sport utility vehicle (SUVs), a recreational vehicle (RVs), etc. The system 11 can be used for accurate estimation of the odometry of the vehicle 10. The vehicle includes a vehicle body 12 and one or more wheels 14 coupled to the vehicle body 12.

Further, the vehicle 10 includes a controller 34 coupled to the vehicle body 12 and one or more sensors 40 in communication with the controller 34. The sensors 40 are coupled to the vehicle body 12 and collect information and generate sensor data indicative of the external or internal vehicle parameters. As non-limiting examples, the sensors 40 may include one or more inertial measurement units (IMUs), yaw rate sensors, ride height sensors, wheel speed sensors (WSSs), lidars, radars, ultrasonic sensors, steering wheel angle sensors (SASs), global navigation satellite system (GNSS) transceivers or receivers, and cameras, among others. The GNSS transceivers or receivers are configured to detect the location of the vehicle 10 in the globe. The WSSs are configured to detect the speed of the wheels 14 of the vehicle 10. The yaw rate sensors are configured to determine the heading of the vehicle 10. The cameras may have a field of view large enough to capture images in front, in the rear, and in the sides of the vehicle 10. The ride height sensors are configured to measure the right height of the vehicle 10. The ultrasonic sensor may detect static and/or dynamic objects. The IMUs are configured to measure and report the specific force, angular rate, acceleration, and the orientation of the vehicle body 12, using a combination of accelerometers, gyroscopes, and sometimes magnetometers. The SASs are configured to measure the steering wheel's rate of turn, wheel angle, among other parameters about the steering wheel of the vehicle 10. All the sensors 40 are configured to generate sensor data. In the present disclosure, the sensor data may be divided into first sensor data and second sensor data for purposes of clarity and simplicity. The first sensor data refers to the data generated, at least in part, by one or more IMUs, WSSs, and one or more steering wheel angle sensors (SAS) of the vehicle 10. The second senor data refers to the data generated, at least in part, by one or more radars of the vehicle 10.

The controller 34 is in communication with the sensors 40 and is programmed to receive sensor data from the sensors 40. The controller 34 includes at least one processor 44 and a non-transitory computer readable storage device or media 46. The processor 44 may be a custom-made processor, a central processing unit (CPU), a graphics processing unit (GPU), an auxiliary processor among several processors associated with the controller 34, a semiconductor-based microprocessor (in the form of a microchip or chip set), a macroprocessor, a combination thereof, or generally a device for executing instructions. The computer readable storage device or media 46 may include volatile and non-volatile storage in read-only memory (ROM), random-access memory (RAM), and keep-alive memory (KAM), for example. KAM is a persistent or non-volatile memory that may be used to store various operating variables while the processor 44 is powered down. The computer-readable storage device or media of the controller 34 may be implemented using a number of memory devices such as PROMs (programmable read-only memory), EPROMS (electrically PROM), EEPROMs (electrically erasable PROM), flash memory, or another electric, magnetic, optical, or combination memory devices capable of storing data, some of which represent executable instructions, used by the controller 34 in controlling the vehicle 10.

The instructions may include one or more separate programs, each of which comprises an ordered listing of executable instructions for implementing logical functions. The instructions, when executed by the processor 44, receive and process signals from the cameras, perform logic, calculations, methods and/or algorithms for automatically controlling the components of the vehicle 10, and generate control signals to the actuators to automatically control the components of the vehicle 10 based on the logic, calculations, methods, and/or algorithms. Although a single controller 34 is shown in FIG. 1, the system 11 may include a plurality of controllers 34 that communicate over a suitable communication medium or a combination of communication mediums and that cooperate to process the sensor signals, perform logic, calculations, methods, and/or algorithms, and generate control signals to automatically control features of the system 11. In various embodiments, one or more instructions of the controller 34 are embodied in the system 11. The non-transitory computer readable storage device or media 46 includes machine-readable instructions (shown, for example, in FIG. 2), that when executed by the one or more processors, cause the processors 44 to execute the method 100 (FIG. 2).

The vehicle 10 further includes one or more vehicle actuators 42 that control one or more vehicle features such as, but not limited to, the propulsion system, the transmission system, accelerator pedal, brake pedal, the electronic power steering system, steering wheel, and the brake system. The vehicle actuators 42 are in communication with the controller 34. Therefore, the controller 34 is programmed to control the operation of the vehicle actuators 42.

Figure 2:
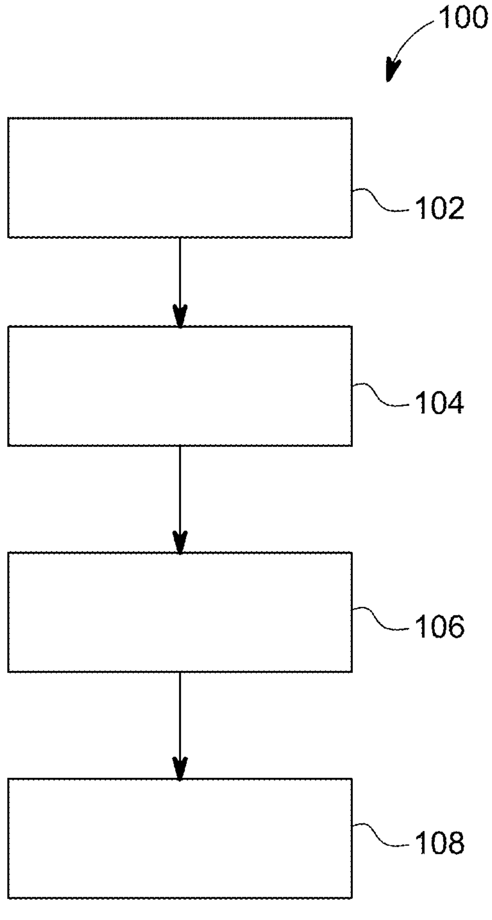
FIG. 2 is a flowchart of a method for estimating vehicle odometry using a radar-based model.

FIG. 2 is a flowchart of a method 100 for odometry estimation using radar information. The method 100 utilizes radar data to adapt and enhance the parameter learns, correct the odometry adaptive filters, and enhance the accuracy of the odometry estimations. The method 100 begins at block 102. At block 102, the controller 34 receives input data or inputs. The input data includes real-time sensor data from the sensors 40, such as the first sensor data and the second sensor data. As discussed above, the first sensor data refers to the data generated, at least in part, by one or more IMUs, WSSs, and one or more SASs of the vehicle 10, and the second senor data refers to the data generated, at least in part, by one or more radars of the vehicle 10. The first sensor data may also include GNSS data generated by the GNSS transceiver or receiver.

As non-limiting examples, the input data includes wheel speed from the wheel speed over time, steering angle measurements over time from the steering angle sensor, rear steering measurements over time from the active rear steering, wheel pulses inertial measurements over time from the inertial measurement unit (IMU), global navigation satellite system (GNSS) data from the GNSS transceiver, and data from a communication gateway module. Then, the method 100 continues to block 104.

Block 104 entails using an adaptive and stochastic filters to determine the longitudinal position, the lateral position, the heading, the longitudinal velocity, the lateral velocity, and the yaw rate of the vehicle 10 in real-time with sensor data (i.e., the first sensor data which is generated by the IMU, the WSS, the GNSS receiver, and the SAS of the vehicle 10 and the second sensor data, which is generated by the radar of the vehicle 10. At block 104, a suitable state observer may be used to determine an initial longitudinal position, an initial lateral position, an initial heading, an initial lateral velocity, an initial longitudinal velocity, and an initial yaw rate. The state observers may be referred to as model-based observers. These model-based observers may be corrected using radar data generated by the radar of the vehicle 10. The radar data may be referred to as the second sensor data. To correct the model-based observers, the controller 34 uses a velocity scale factor, an IMU scale factor, and suspension dynamics corrections.

The radar of the vehicle 10 may be used to determine the heading, the longitudinal velocity, and the lateral velocity of the vehicle 10 in real-time. For example, the controller 34 uses the azimuth between a radar and a stationary object in front of the vehicle 10 to determine the heading of the vehicle 10. In a driving scene with enough reflection, the radar has the capability of providing vehicle velocity relative to the scene. This data can be clustered and provided to us in velocity domain. The model-based observers provide odometry estimation in terms of relative vehicle motion using the first sensor data. The first sensor data may have uncertainties due to unmodeled dynamics, measurement noise, and environmental uncertainties, which may be expressed as follows:

$$\widetilde{\Delta x} = \Delta x + w_x$$

$$\widetilde{\Delta y} = \Delta y + w_y$$

$$\widetilde{\Delta \psi} = \Delta y + w_\psi$$

where:

$\Delta x$ is the delta (or change in) of the longitudinal position (i.e., the position x) of the vehicle 10;

$\Delta y$ is the delta (or change in) of the lateral position (i.e., the position y) of the vehicle 10;

$\Delta\psi$ is the delta (or change in) of the heading of the vehicle 10;

$w_x$ is the uncertainty in $\Delta x$;

$w_y$ is the uncertainty in $\Delta y$;

$w_\psi$ is the uncertainty in $\Delta\psi$;

$\widetilde{\Delta x}$ delta position x with uncertainty;

$\widetilde{\Delta y}$ y delta position y with uncertainty; and $\widetilde{\Delta \psi}$ delta heading with uncertainty.

An estimation error may be calculated using the radar data and the following equations:

$$e_x = v_s(1).dt - \widetilde{\Delta x}$$

$$e_y = v_s(2).dt - \widetilde{\Delta y}$$

-continued $$e_\psi = a\tan 2\left(\frac{v_s(2)}{v_s(1)}\right) - \widetilde{\Delta\psi}$$

where:

$v_s$ is the radar provided scene velocity of the vehicle 10;

$e_x$ is the error term for x position (i.e., for the longitudinal position) of the vehicle 10;

$e_y$ is the error term for y position (i.e., for the lateral position) of the vehicle 10;

$e_\psi$ is the error term for heading of the vehicle 10;

$\widetilde{\Delta x}$ delta position x with uncertainty;

$\widetilde{\Delta y}$ delta position y with uncertainty;

$\widetilde{\Delta \psi}$ delta heading with uncertainty; and t is time.

After calculating the errors, the adaptive filter may be implemented using the following equations:

$$\Delta x_{k+1} = \Delta x_k + g_{k,x} e_{x,k}$$

$$\Delta y_{k+1} = \Delta y_k + g_{k,y} e_{y,k}$$

$$\Delta \psi_{k+1} = \Delta \psi_k + g_{k,\psi} e_{\psi,k}$$

where:

k is a time step;

$\Delta x_{k+1}$ is a filtered term for the longitudinal position of the vehicle at time k+1;

$\Delta y_{k+1}$ is a filtered term for the lateral position of the vehicle at time k+1;

$\Delta\psi_{k+1}$ is filtered term for the heading of the vehicle at time k+1;

$\Delta x_k$ is a change in a longitudinal position of the vehicle at time k;

$\Delta y_k$ is a change in a lateral position of the vehicle at time k;

$\Delta\psi_k$ is a change in a heading of the vehicle at time k;

$g_{k,x}$ is the longitudinal position gain at time k;

$g_{k,y}$ is the lateral position gain at time k;

$g_{k,\psi}$ is the heading gain at time k;

$e_{x,k}$ is the longitudinal position error at time k;

$e_{y,k}$ is the lateral position error at time k; and $e_{\psi,k}$ is the heading error at time k.

The longitudinal position gain, the lateral position gain, and the heading gain are calculated using recursive least squares. Using the corrected adaptive filters described above, the controller 34 corrects the initial longitudinal position, the initial longitudinal velocity, the initial lateral position, the initial lateral velocity, the initial yaw rate, and the initial heading of the vehicle using the longitudinal position error, the lateral position error, and the heading error, respectively, thereby generating a corrected longitudinal position, a corrected lateral position, a corrected lateral velocity, a corrected longitudinal velocity, a corrected yaw rate, and a corrected heading of the vehicle 10. The method 100 then proceeds to block 106.

At block 106, the controller 34 executes an odometry integrity monitor using the radar data from the radar of the vehicle 10. First, the controller 34 detects any faulty sensor signal from the sensors 40 (i.e., WSS, IMU, SAS, radar). If one or more faulty sensor signals are detected, the controller 34 performs a remediation procedure. Then, the controller 34 performs a physics checks. To do so, the controller 34 checks for unreasonable longitudinal velocity values, unreasonable lateral velocity values, unreasonable turn rates, unreasonable pitch, and unreasonable roll. The controller 34 also performs a consistency check between the yaw rate and the longitudinal velocity of the vehicle 10 and the between the yaw rate and the lateral velocity of the vehicle 10. The controller 34 also performs an estimation characteristic check. The estimation characteristic check includes a check for negative covariance matrix diagonal elements and an outlier detection. The method 100 then continues to block 108.

At block 108, the controller 34 controls the vehicle 10 using the corrected longitudinal position, the corrected lateral position, the corrected lateral velocity, the corrected longitudinal velocity, the corrected yaw rate, and the corrected heading of the vehicle 10. For example, the controller 34 may control one or more ADAS of the vehicle 10 using the corrected longitudinal position, the corrected lateral position, the corrected lateral velocity, the corrected longitudinal velocity, the corrected yaw rate, and the corrected heading of the vehicle 10.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the presently disclosed system and method that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

The drawings are in simplified form and are not to precise scale. For purposes of convenience and clarity only, directional terms such as top, bottom, left, right, up, over, above, below, beneath, rear, and front, may be used with respect to the drawings. These and similar directional terms are not to be construed to limit the scope of the disclosure in any manner.

Embodiments of the present disclosure are described herein. It is to be understood, however, that the disclosed embodiments are merely examples and other embodiments can take various and alternative forms. The figures are not necessarily to scale; some features could be exaggerated or minimized to display details of particular components. Therefore, specific structural and functional details disclosed herein are not to be interpreted as limiting, but merely as a representative basis for teaching one skilled in the art to variously employ the presently disclosed system and method. As those of ordinary skill in the art will understand, various features illustrated and described with reference to any one of the figures may be combined with features illustrated in one or more other figures to produce embodiments that are not explicitly illustrated or described.

The combinations of features illustrated provide representative embodiments for typical applications. Various combinations and modifications of the features consistent with the teachings of this disclosure, however, could be desired for particular applications or implementations.

Embodiments of the present disclosure may be described herein terms of functional and/or logical block components and various processing steps. It should be appreciated that such block components may be realized by a number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with a number of systems, and that the systems described herein are merely exemplary embodiments of the present disclosure.

For the sake of brevity, techniques related to signal processing, data fusion, signaling, control, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that alternative or additional functional relationships or physical connections may be present in an embodiment of the present disclosure.

This description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims.

What is claimed is:

1. A method for determining a vehicle odometry, comprising:

receiving, by a controller of a vehicle, a first sensor data;

receiving, by the controller of the vehicle, a second sensor data;

determining, by the controller of the vehicle, an initial longitudinal position, an initial lateral position, and an initial heading of the vehicle using the first sensor data, wherein the first sensor data is generated by an inertial measurement unit (IMU) of the vehicle, a wheel speed sensor (WSS), and a steering wheel angle sensor (SAS) of the vehicle;

determining, by the controller of the vehicle, a longitudinal position error defined by the equation: $e_x = v_s(1) \cdot dt - \widetilde{\Delta x}$, a lateral position error defined by the equation: $e_y = v_s(2) \cdot dt - \widetilde{\Delta y}$, and a heading error of the vehicle defined by the equation $$e_\psi = \operatorname{atan2}\left(\frac{v_s(2)}{v_s(1)}\right) - \widetilde{\Delta\psi}$$

using the second sensor data, wherein the second sensor data is generated by a radar of the vehicle, $v_s$ is a scene velocity of the vehicle provided by the radar, $e_x$ is the longitudinal position error of the vehicle, $e_y$ is the lateral position error of the vehicle, $e_\psi$ is the heading error of the vehicle, $\widetilde{\Delta x}$ is a change in the initial longitudinal position with uncertainty, $\widetilde{\Delta y}$ is a change in the initial lateral position with uncertainty, $\widetilde{\Delta \psi}$ is a change in the heading with uncertainty, and t is a point in time;

correcting the initial longitudinal position, the initial lateral position, and the initial heading of the vehicle using the longitudinal position error, the lateral position error, and the heading error, respectively, thereby generating a corrected longitudinal position, a corrected lateral position, and a corrected heading of the vehicle within an odometry system of the vehicle based on the longitudinal position error, the lateral position error, and the heading error; and controlling the vehicle using the corrected longitudinal position, the corrected lateral position, and the corrected heading.

2. The method of claim 1, wherein the corrected longitudinal position, the corrected lateral position, and the corrected heading of the vehicle are determined using an adaptive filter.

3. The method of claim 2, wherein the corrected longitudinal position is based on a longitudinal position gain.

4. The method of claim 3, wherein the corrected lateral position is based on a lateral position gain.

5. The method of claim 4, wherein the corrected heading is based on a heading gain.

6. The method of claim 5, further comprising determining a longitudinal velocity of the vehicle using the first sensor data and the second sensor data.

7. The method of claim 6, further comprising determining a lateral velocity of the vehicle using the first sensor data and the second sensor data.

8. The method of claim 7, further comprising determining a yaw rate of the vehicle using the first sensor data and the second sensor data.

9. The method of claim 8, wherein the adaptive filter is implemented using a plurality of equations, and the plurality of equations includes:

$$\Delta x_{k+1} = \Delta x_k + g_{k,x} e_{x,k}$$

$$\Delta y_{k+1} = \Delta y_k + g_{k,y} e_{y,k}$$

$$\Delta \psi_{k+1} = \Delta \psi_k + g_{k,\psi} e_{\psi,k}$$

where:

k is a time step;

$\Delta x_{k+1}$ is a filtered term for the initial longitudinal position of the vehicle;

$\Delta y_{k+1}$ is a filtered term for the initial lateral position of the vehicle;

$\Delta d_{k+1}$ is a filtered term for the initial heading of the vehicle;

$\Delta x_k$ is a change in a longitudinal position of the vehicle at time k;

$\Delta y_k$ is a change in a lateral position of the vehicle at time k;

$\Delta \psi_k$ is a change in a heading of the vehicle at time k;

$g_{k,x}$ is the longitudinal position gain at time k;

$g_{k,y}$ is the lateral position gain at time k;

$g_{k,\psi}$ is the heading gain at time k;

$e_{x,k}$ is the longitudinal position error at time k;

$e_{y,k}$ is the lateral position error at time k; and $e_{\psi,k}$ is the heading error at time k.

10. A system, comprising:

a plurality of sensors, wherein the plurality of sensors includes an inertial measurement unit (IMU), a wheel speed sensor (WSS), a steering wheel angle sensor (SAS), and a radar;

a controller in communication with the plurality of sensors, wherein the controller is programmed to:

receive a first sensor data, wherein the first sensor data is generated by the IMU, the WSS, and SAS;

receive a second sensor data, wherein the second sensor data is generated by the radar of a vehicle;

determine an initial longitudinal position, an initial lateral position, and an initial heading of a vehicle using the first sensor data;

determine a longitudinal position error defined by the equation: $e_x = v_s(1) \cdot dt - \widetilde{\Delta x}$, a lateral position error defined by the equation: $e_y = v_s(2) \cdot dt - \widetilde{\Delta y}$, and a heading error of the vehicle defined by the equation:

$$e_\psi = \operatorname{atan2}\left(\frac{v_s(2)}{v_s(1)}\right) - \widetilde{\Delta \psi}$$

using the second sensor data, wherein the second sensor data is generated by the radar, $v_s$ is a provided scene velocity of the vehicle provided by the radar, $e_x$ is the longitudinal position error of the vehicle, $e_y$ is the lateral position error of the vehicle, $e_\psi$ is the heading error of the vehicle, $\widetilde{\Delta x}$ is a change in the initial longitudinal position with uncertainty, $\widetilde{\Delta y}$ is a change in the initial lateral position with uncertainty, $\widetilde{\Delta \psi}$ is a change in the heading with uncertainty, and t is a point in time;

correct the initial longitudinal position, the initial lateral position, and the initial heading of the vehicle using the longitudinal position error, the lateral position error, and the heading error, respectively, thereby generating a corrected longitudinal position, a corrected lateral position, and a corrected heading of the vehicle within an odometry system of the vehicle based on the longitudinal position error, the lateral position error, and the heading error; and control the vehicle using the corrected longitudinal position, the corrected lateral position, and the corrected heading.

11. The system of claim 10, wherein the initial longitudinal position, the initial lateral position, and the initial heading of the vehicle are determined using an adaptive filter.

12. The system of claim 11, wherein the corrected longitudinal position is based on a longitudinal position gain.

13. The system of claim 12, wherein the corrected lateral position is based on a lateral error gain.

14. The system of claim 13, wherein the corrected heading is based on a heading gain.

15. The system of claim 14, wherein the controller is programmed to determine a longitudinal velocity of the vehicle using the first sensor data and the second sensor data.

16. The system of claim 15, wherein the controller is programmed to determine a lateral velocity of the vehicle using the first sensor data and the second sensor data.

17. The system of claim 16, wherein the controller is programmed to determine a yaw rate of the vehicle using the first sensor data and the second sensor data.

18. The system of claim 17, wherein the adaptive filter is implemented using a plurality of equations, and the plurality of equations includes:

$$\Delta x_{k+1} = \Delta x_k + g_{k,x} e_{x,k}$$

$$\Delta y_{k+1} = \Delta y_k + g_{k,y} e_{y,k}$$

$$\Delta \psi_{k+1} = \Delta \psi_k + g_{k,\psi} e_{\psi,k}$$

where:

k is a time step;

$\Delta x_{k+1}$ is a change in a longitudinal position of the vehicle at time k+1;

$\Delta y_{k+1}$ is a change in a lateral position of the vehicle at time k+1;

$\Delta \psi_{k+1}$ is a change in a heading of the vehicle at time k+1;

$\Delta x_k$ is a change in a longitudinal position of the vehicle at time k;

$\Delta y_k$ is a change in a lateral position of the vehicle at time k;

$\Delta \psi_k$ is a change in a heading of the vehicle at time k;

$g_{k,x}$ is the longitudinal position gain at time k;

$g_{k,y}$ is the lateral position gain at time k;

$g_{\psi,y}$ is the heading gain at time k;

$e_{x,k}$ is the longitudinal position error at time k;

$e_{y,k}$ is the lateral position error at time k; and $e_{\psi,k}$ is the heading error at time k.

19. A vehicle, comprising:

a vehicle body;

a plurality of sensors coupled to the vehicle body, wherein the plurality of sensors includes an inertial measurement unit (IMU), a wheel speed sensor (WSS), a steering wheel angle sensor (SAS), and a radar;

a controller in communication with the plurality of sensors, wherein the controller is coupled to the vehicle body, and the controller is programmed to:

receive a first sensor data, wherein the first sensor data is generated by the IMU, the WSS, and SAS;

receive a second sensor data, wherein the second sensor data is generated by the radar of the vehicle;

determine an initial longitudinal position, an initial lateral position, and an initial heading of a vehicle using the first sensor data;

determine a longitudinal position error defined by the equation: $e_x = v_s(1)\cdot dt - \widetilde{\underline{\Delta x}}$, a lateral position error defined by the equation: $e_y = v_s(2)\cdot dt - \widetilde{\underline{\Delta y}}$, and a heading error of the vehicle defined by the equation:

$$e_\psi = \operatorname{atan2}\left(\frac{v_s(2)}{v_s(1)}\right) - \widetilde{\underline{\Delta \psi}}$$

using the second sensor data, wherein the second sensor data is generated by the radar, $v_s$ is a provided scene velocity of the vehicle provided by the radar, $e_x$ is the longitudinal position error of the vehicle, $e_y$ is the lateral position error of the vehicle, $e_\psi$ is the heading error of the vehicle, $\widetilde{\underline{\Delta x}}$ is a change in the initial longitudinal position with uncertainty, $\widetilde{\underline{\Delta y}}$ is a change in the initial lateral position with uncertainty, $\widetilde{\underline{\Delta \psi}}$ is a change in the heading with uncertainty, and t is a point in time;

correct the initial longitudinal position, the initial lateral position, and the initial heading of the vehicle using the longitudinal position error, the lateral position error, and the heading error, respectively, thereby generating a corrected longitudinal position, a corrected lateral position, and a corrected heading of the vehicle within an odometry system of the vehicle based on the longitudinal position error, the lateral position error, and the heading error; and control the vehicle using the corrected longitudinal position, the corrected lateral position, and the corrected heading.

20. The vehicle of claim 17, wherein the initial longitudinal position, the initial lateral position, and the initial heading of the vehicle are determined using an adaptive filter.

* * * * *